Sept. 25, 1956    B. G. DAGGETT    2,764,043
CIRCULAR SAW GRINDERS
Filed Dec. 19, 1952    3 Sheets-Sheet 1
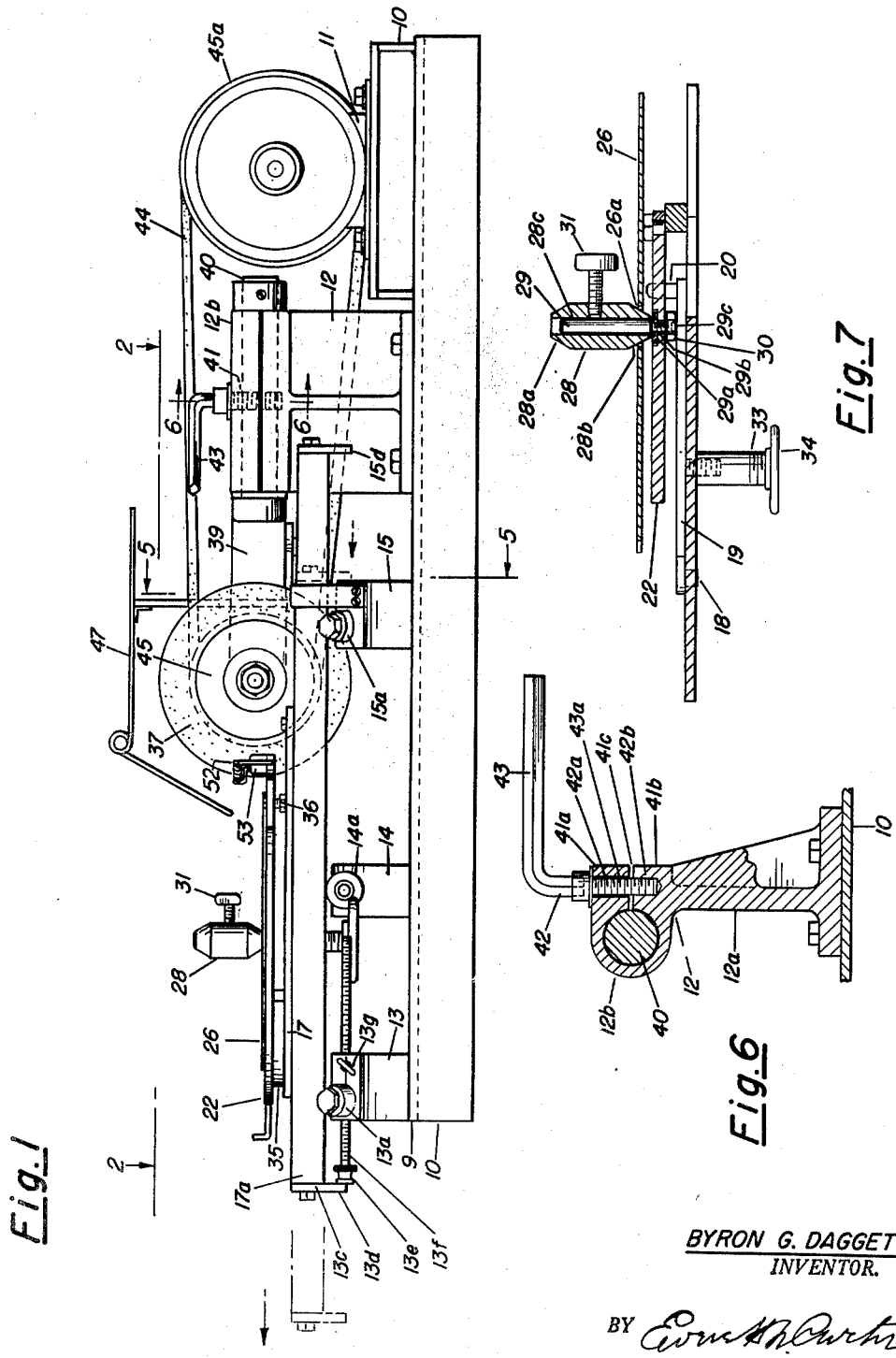
BYRON G. DAGGETT
INVENTOR.
BY [signature]
ATTORNEY Sept. 25, 1956  B. G. DAGGETT  2,764,043
CIRCULAR SAW GRINDERS
Filed Dec. 19, 1952  3 Sheets-Sheet 2
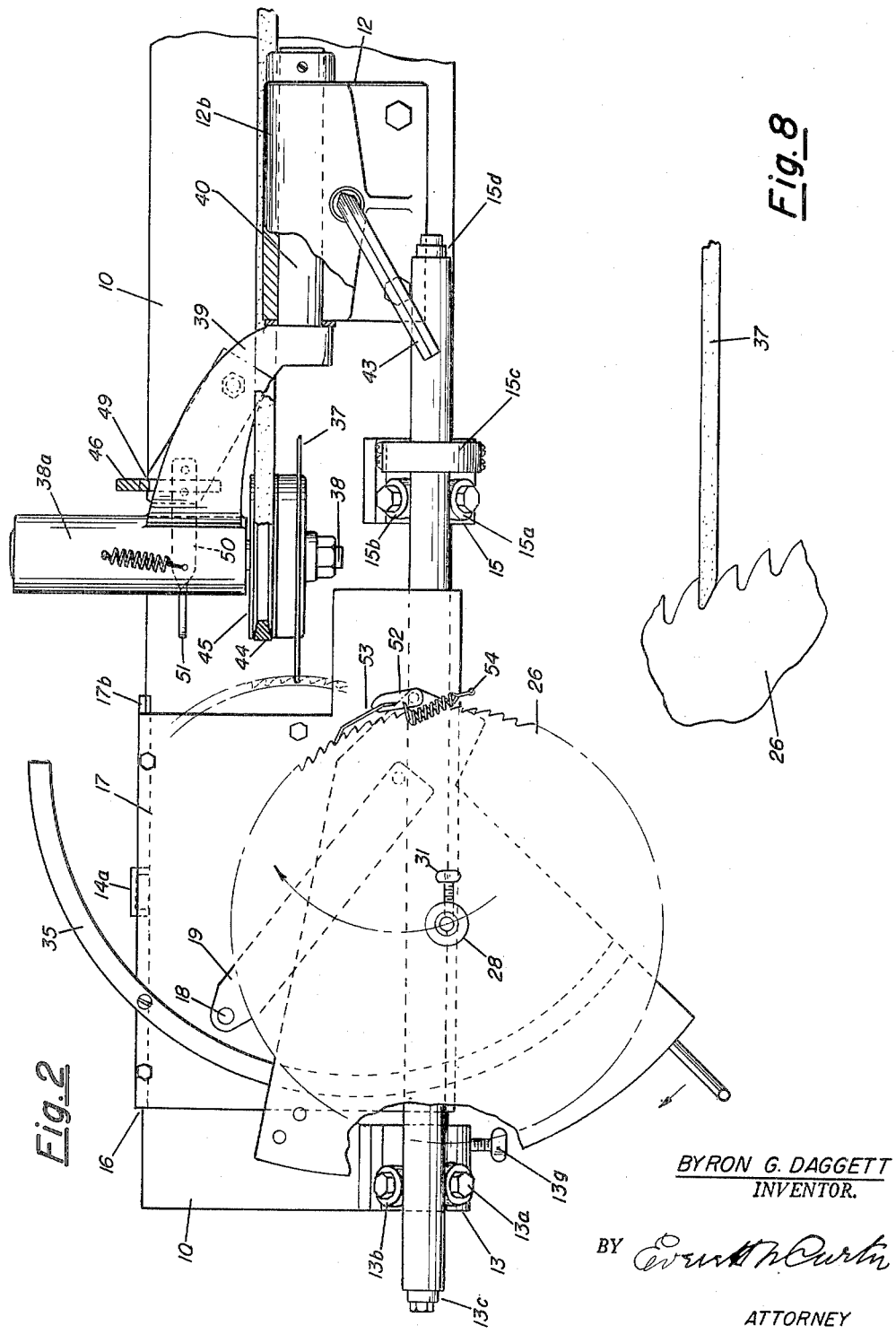
BYRON G. DAGGETT
INVENTOR.
BY [signature]
ATTORNEY Sept. 25, 1956     B. G. DAGGETT     2,764,043
CIRCULAR SAW GRINDERS
Filed Dec. 19, 1952                             3 Sheets-Sheet 3
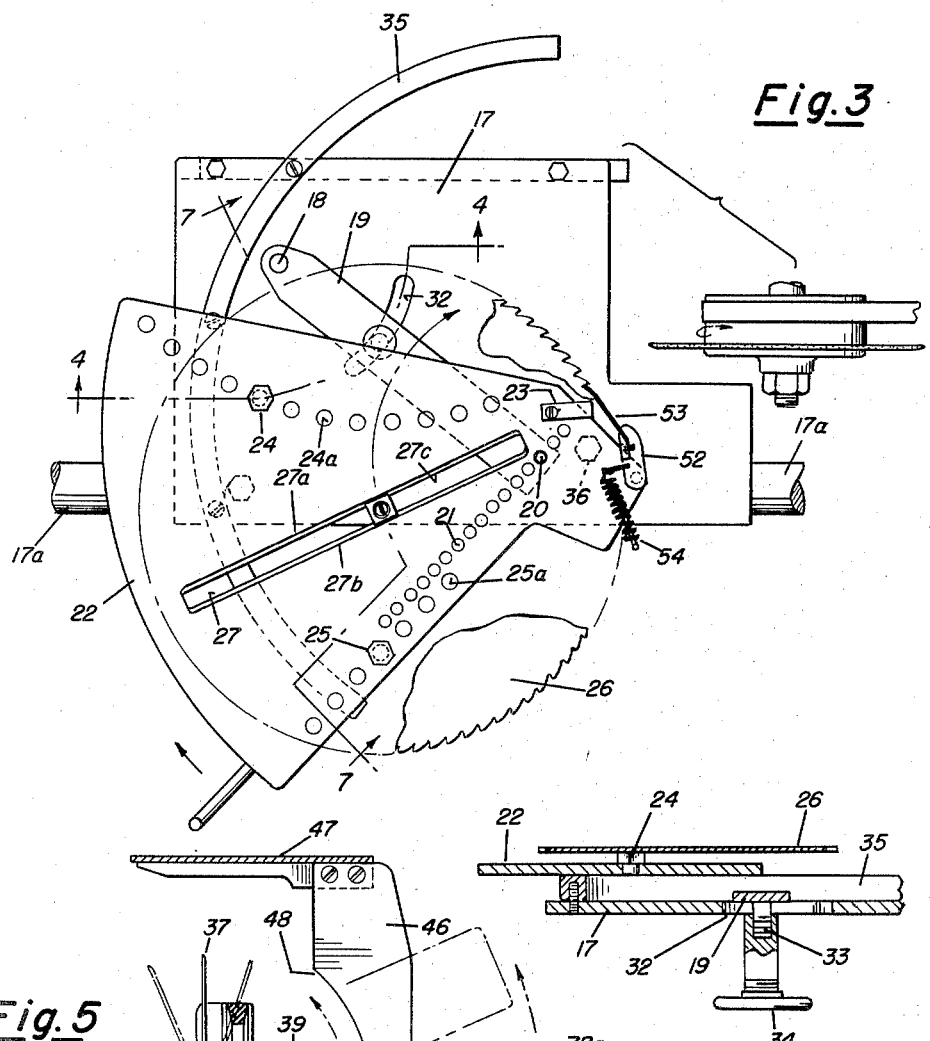
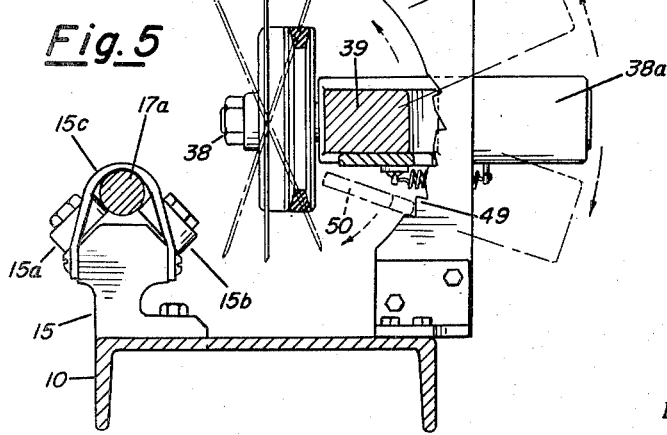
BYRON G. DAGGETT
*INVENTOR.*
BY *Everett H Curtis*
ATTORNEY

United States Patent Office 2,764,043
Patented Sept. 25, 1956

2,764,043

CIRCULAR SAW GRINDERS

Byron G. Daggett, San Diego, Calif.

Application December 19, 1952, Serial No. 326,848

4 Claims. (Cl. 76—43)

My invention relates to circular saw grinders, and its objects are to precision grind and sharpen the teeth of a circular saw, to accomplish the sharpening of the teeth through a minimum amount of time and labor, consistent with accomplishing the best results; to render the parts readily accessible for inspection, adjustment, replacement, restoration or repair; and generally to provide a circular saw grinder, which is economical of construction, saving of labor, efficient in action and of prolonged life and durability. My invention further consists of other novel features of construction, and combinations and arrangements of elements and parts, illustrated in the drawing and hereinafter more specifically described and claimed.

Attention is hereby directed to the accompanying drawing, illustrating a preferred form of my invention, in which similar numerals of designation refer to similar parts throughout the several views and in which, Figure 1 is a side elevational view of my complete apparatus, showing the supporting base, and mounted thereon the motor, rollers and bearing blocks, carriage, table, grinding wheel, pillar box and operative connecting parts and mechanisms;

Fig. 2 is a plan view of the apparatus shown in Fig. 1 looking downwardly at the same in the direction indicated by the arrows 2—2;

Fig. 3 is an enlarged detailed view of the saw and adjacent parts, illustrated in Fig. 2, and showing the same partly broken away for the purpose of better illustration;

Fig. 4 is a detailed sectional view of a portion of Fig. 3 on line 4—4 thereof, looking in the direction indicated by the arrows;

Fig. 5 is a detailed view, partly in section, of the grinding wheel, arbor, ratchet adjustment mechanism therefor, and adjacent parts on line 5—5 of Fig. 1 looking in the direction of the arrows;

Fig. 6 is an enlarged detailed section on the line 6—6 of Fig. 1 looking in the direction of the arrows and showing the locking mechanism for the pillar box;

Fig. 7 is an enlarged detailed vertical section on line 7—7 of Fig. 3, looking in the direction indicated by the arrows, and showing the means for detachably securing the saw to the top of the table; and Fig. 8 is a detailed view showing contact of the edge of the grinding wheel with one of the teeth of the circular saw.

Referring to the drawing, mounted upon the top 9 of the base 10 are the motor 11, pillar box 12, and the bearing blocks 13, 14 and 15. In the bearings of these blocks, as shown, are respectively journalled the shafts of the pair of inclined rollers 13a, 13b, the shaft of the single level roller 14a, and the shafts of the pair of inclined rollers 15a, 15b; all of which rollers are shaped and positioned to make rolling contact with the runners of the carriage 16, to allow said carriage to move easily and longitudinally thereon, and to maintain said carriage constantly in level position.

The carriage 16 comprises the plate 17 resting upon and secured to the round runner 17a and to the rectangular shaped runner 17b, said runners being in spaced parallel relation, and respectively attached underneath to opposite sides of said plate; the runner 17a engaging with the inclined rollers 13a, 13b, 15a and 15b; and the runner 17b engaging with the level roller 14a. As shown, the outer end of the runner 17a is held in engagement with the rollers 15a and 15b by the loop of the broad metallic strap 15c, the ends of which are attached by screws or bolts to the body of the bearing block 15. A stop 15d attached to the outer end of the runner 17a serves to prevent said runner from being completely withdrawn rearwardly out of said loop, thereby limiting the backward movement of said carriage. Also a stop 13c, secured to the inner end of the runner 17a, serves to arrest the forward movement of the said carriage; the stop 13c having a downwardly extending lip 13d positioned to make abutting contact with the head 13e of the manually adjustable screw 13f, the shank of which is in threaded engagement with a passageway through the roller bearing block 13, and which shank is in parallel relation with the bar 17a. To secure the screw 13f in adjusted position, I preferably provide the thumb screw 13g, in threaded engagement with a passageway in bearing block 13 leading to contact with the said screw.

Pivotally mounted upon the plate 17 by the pin 18 is one end of the flat elongated strip 19, the shank of said pin being integral with said strip and projecting downwardly therefrom and passing through an opening provided therefor in said plate; and integral with the other end portion of said strip and extending upwardly therefrom is the pin 20, shaped and positioned to effect required engagement with one of the aligned series of holes 21 passing through the table 22, which table is located above the plate 17 and above the strip 19. The table 22 is generally in the form of a segment of a flat, smooth piece of metal, and is pivotally mounted to swing laterally through engagement of the pin 20 with one of the holes 21.

Also, there is affixed to the top of the plate 17, the curved bar 35, serving as a bearing for the table 22; and secured to the bottom of the table 22 is, near the narrow end thereof, the stud 36, shaped and positioned to make sliding contact with the top of the plate 17 and together with said bar to maintain spaced relation between said plate and said table.

Firmly affixed to the top of the table 22 adjacent to the apex portion thereof is the bearing plate 23, and detachably mounted upon the said table are the bearing pins 24 and 25, the shanks of which are shaped to effect removable engagement with the holes of the series of holes 24a and 25a extending vertically through the said table. As shown, the bearing plate 23, and the heads of the removable bearing pins 24 and 25, whatever may be the engagement of their shanks with the holes of said series, are so positioned as always to afford a level engagement with and seating of the circular saw 26.

In order to secure the saw to the table 22, I preferably provide such table with the step-slot 27, the parallel spaced walls of which are shaped to form the steps or ledges 27a and 27b, and the narrow central aperture 27c extending therebetween; and slidably seated upon said steps and conforming to the shape thereof is the square washer 29a, the opening 29b of which is aligned with the aperture 27c. Engaging with the central opening or eye 26a of the saw 26 is the hollow cylinder 28, having the conical shaped ends 28a and 28b, either of which is shaped to make wedging contact with the wall of the opening 26a, and to extend downwardly therethrough slightly beyond the upper face of said saw; the bore or hollow 28c of said cylinder forming a passageway of uniform diameter shaped to receive the shaft 29, and the lower end portion of which shaft, protruding downwardly from said passageway, is reduced in diameter to form the extension 29c, shaped and located to pass through the opening 29b of the washer 29a, and having its end threaded to engage with the nut 30, thereby serving to secure the said shaft firmly to the table 22.

To secure the said shaft 29 firmly within the bore 28c of said cylinder 28 and against vertical displacement therein, I also preferably provide the thumb screw 31 the shank of which is in threaded engagement with an opening extending through the wall of said cylinder and permitting engagement of the end of said thumb screw with the said shaft 29. Formed within the plate 17 is the arcuate groove or slot 32 through which downwardly extends the threaded pin 33, integral with the strip 19, to the bottom end of which pin is secured the hand nut 34; the purpose of said nut being to secure through said pin the strip 19 in various angular positions as hereinafter described.

The grinding wheel 37 is mounted upon the arbor 38 journalled in a bearing 38a formed in the inner end portion of the elbow shaped casting 39; the outer end of which casting is reduced in size to form the spindle or axle 40 journalled in the split bearing 12b of the pillar box 12.

The pillar box 12 comprises the upright support 12, the split bearing 12 and the locking member 42. The support 12 is an upwardly extending standard, the flanged bottom of which is secured by bolts or screws to the base 10, and integral with said support is the split bearing 12, the divided upper and lower walls 41a and 41b of which are separated by a gap 41c. Extending vertically through the wall 41a is the smooth passage 42a, and aligned therewith in the wall 41b below is formed the threaded socket 42b. The locking member 42 is formed with the laterally extending handle 43 and the downwardly extending shank 43a shaped to pass with clearance readily through the passageway 42a, and having its lower end portion threaded to effect engagement with socket 42b. As is obvious, upon the turning of the member 42, the said walls 41a and 41b will be clamped and locked upon the spindle or axle 40, or released therefrom; the ultimate effect of said clamping being to lock or, upon loosening, to permit the turning of the arbor 38 and the adjustment of the grinding wheel to the angle desired as shown in Fig. 5. For the rotation of the grinding wheel, I provide the belt 44, connecting the pulley flange 45 on said wheel with the pulley 45a of the motor 11.

For the angular turning adjustment of the arbor 38 (carried in the bearing 38a of the casting 39, and turned through the movement of the spindle 40 of said casting within the split bearing 12b), I provide the flat upright strip 46, the lower end of which is secured to the base 10, and to the upper end of which is attached the protective guard or shield 47; the inside of said strip having formed therein the concave shaped recess 48, whose edge is serrated with the ratchet teeth 49, positioned to make releasable contact with the spring retained ratchet finger 50, pivotally mounted on the bottom of the bearing 38a, and releasable through the application of the thumb and finger handle 51. Through the manual operation of the said handle 51, the finger 50 may be made to make contact with any of the teeth 49, and thereby to adjust and lock in the desired inclined position the grinding wheel 37.

To accomplish the advance tooth by tooth of a circular saw, as for example the saw 26, I provide the conventional pawl 52, pivotally mounted on the narrow end portion of the table 22; the said pawl having secured thereto the flat resilient tongue 53 positioned to make successive engagement with the said teeth through the action of the usual contraction spring 54 effecting turning connection of the pawl with the table 22.

After adjusting the machine to sharpen a specific saw, the operation begins by sharpening the face of each or every other tooth as the occasion requires, which is brought about through one or two complete revolutions of the blade on the table, at one or two tooth intervals. This being acomplished, the finished face is held in contact with the pawl, the carriage is held firmly to the stop, and by swinging of the table with the tooth securely held to the pawl and contacting grinding wheel, the desired radius and height is in this way secured in the same order as before in facing, until, during the revolution of the saw, the sharpening operation upon each tooth has been completed. Accordingly, to sharpen the teeth of a circular saw upon this machine, it is necessary to obtain the requisite hook of each of the teeth, and to form the correct back thereof with conforming clearance relief and with the provision of ample gullet or throat between teeth for the disposal of accumulating saw dust. Measuring three or four saw teeth distance from the pawl along the aligned series of holes 21 will determine the correct hole for the radius point to form the desired shape of the back of the tooth. This hole when engaged with the radius pin 20 upon the free end of strip 19 (such strip having been secured against movement by the nut 34), allows an off-center swing action of the saw blade upon the table, so that the teeth of the saw are each in turn first face ground, and then brought back in operative position to the pawl while contacting the grinding wheel; over grinding of the teeth being prevented by action of the carriage stop 13c.

My invention may be embodied in other specific forms without departing from the spirit or essential characteristics thereof. The present embodiment, as above set forth, is therefore to be considered in all respects as illustrative and not restrictive, the scope of my invention being indicated by the appended claims rather than by the above description, and all changes which come within the meaning and range of equivalency of the claims are therefore intended to be embraced therein.

What I claim and desire to secure by Letters Patent is:

1. In an apparatus for precision grinding of the teeth of a circular saw, the combination of a frame, a grinding wheel mounted thereon; a carriage for said saw mounted to move upon said frame to and from said grinding wheel; means for effecting angular change of position of the grinding wheel in respect to the bevel of the teeth of the saw; and pawl controlled means for radially shaping the back of the teeth of the saw from varying pivot points to conform to the position of the grinding wheel and for radially forming each of the saw teeth.

2. In an apparatus for precision grinding the teeth of a circular saw, the combination of a frame, a grinding wheel mounted thereon; a carriage for said saw mounted to move upon said frame to and from said grinding wheel; stop means for controlling and limiting the movement of said carriage; means for effecting angular change of position of the grinding wheel in respect to the bevel of the teeth of the saw; and pawl controlled means for radially shaping the back of the teeth of the saw.

3. In an apparatus for precision grinding the teeth of a circular saw, the combination of a frame, a grinding wheel mounted thereon; a carriage for said saw mounted to move upon said frame to and from said grinding wheel; an arm one end of which is pivotally mounted to swing laterally upon the deck of said carriage, a table pivotally mounted upon the other end of said arm; means for effecting angular change of position of the grinding wheel and table in respect to the bevel of the teeth of the saw to grind the face of said teeth; and pawl controlled means upon said table for radially shaping the back of each tooth of the saw to conform to the grinding wheel and for radially forming the back of each of the saw teeth.

4. In an apparatus for precision grinding the teeth of a circular saw, the combination of a frame, a grinding wheel mounted thereon; a carriage for said saw mounted to move upon said frame to and from said grinding wheel; stop means for controlling and limiting the movement of said carriage; an elongated flat arm one end of which is pivotally mounted to swing laterally upon the deck of said carriage; a flat table pivotally mounted upon and above the other end of said arm; means for effecting angular change of position of the grinding wheel and table in respect to the bevel of the teeth of the saw to grind the face of said teeth; and pawl controlled means upon said table for radially shaping the back of each tooth of the saw to conform to the grinding wheel and for radially forming the back of each of the saw teeth.

References Cited in the file of this patent

UNITED STATES PATENTS

| | | |
|---|---|---|
| 164,068 | Burgher | June 1, 1875 |
| 315,715 | Bush, Jr. | Apr. 14, 1885 |
| 330,399 | Herhold et al. | Nov. 17, 1885 |
| 391,176 | Mealey | Oct. 16, 1888 |
| 2,319,437 | Biasotti | May 18, 1943 |
| 2,570,118 | Hamberger | Oct. 2, 1951 |